United States Patent [19]
Camras

[11] 3,725,608
[45] Apr. 3, 1973

[54] MAGNETIC TRANSDUCER SYSTEM WITH HEAD ENGAGING SLIDABLY SUPPORTED TAPE SOAP ADJACENT THE CAPSTAN

[75] Inventor: Marvin Camras, Glencoe, Ill.

[73] Assignee: IIT Research Institute, Chicago, Ill.

[22] Filed: Aug. 4, 1970

[21] Appl. No.: 60,806

Related U.S. Application Data

[63] Continuation-in-part of Ser. No. 44,510, June 8, 1970.

[52] U.S. Cl. ..................179/100.2 C, 179/100.2 CA, 179/100.2 Z, 274/4 D

[51] Int. Cl. ..........................G11b 5/54, G11b 15/32

[58] Field of Search...179/100.2 R, 100.2 T, 100.2 S, 179/100.2 Z, 100.2 CA, 100.2 C; 274/4 R, 4 D, 11 D, 11 E; 226/195

[56] References Cited

UNITED STATES PATENTS

| | | | |
|---|---|---|---|
| 3,049,595 | 8/1962 | Johnson | 179/100.2 T |
| 3,237,831 | 3/1966 | Johnson | 226/195 |
| 3,045,072 | 7/1962 | Brede | 179/100.2 R |
| 3,219,246 | 11/1965 | Kihara | 226/195 |
| 3,585,313 | 6/1971 | Newell | 179/100.2 CA |

OTHER PUBLICATIONS

IBM Tech Disc. Bulletin, Vol. 9, No. 8, Jan. 1967 p. 908–"Automatic Tape Threading" – R. B. Johnson et al.

*Primary Examiner*—Bernard Konick
*Assistant Examiner*—Jay P. Lucas
*Attorney*—Hill, Sherman, Meroni, Gross & Simpson

[57] ABSTRACT

A magnetic tape apparatus wherein a capstan drive assembly provides a tape path thereabout and receives a transducer head with a convex face for scanning engagement with the tape. A magnetic shield may be interposed between the capstan and the head where the capstan is of magnetizable steel. The motor, flywheel and capstan form a unitary assembly which preferably includes a bearing for the outer end of the capstan. A endless loop or reel-to-reel tape cartridge configuration may be engaged with the capstan assembly without manual threading. Idler rollers for the capstan are of configuration to tension the tape at the transducer head location, and may be interchanged to tension the tape in either direction of movement. A preferred head is operable with bias of 10 megahertz or more.

4 Claims, 18 Drawing Figures

INVENTOR.
Marvin Camras

BY Hill, Sherman, Meroni, Gross & Simpson ATTORNEYS

INVENTOR.

Marvin Camras

BY Hill, Sherman, Meroni, Gross & Simpson ATTORNEYS

INVENTOR.

Marvin Camras

BY Hill, Sherman, Meroni, Gross & Simpson

ATTORNEYS

MAGNETIC TRANSDUCER SYSTEM WITH HEAD ENGAGING SLIDABLY SUPPORTED TAPE SOAP ADJACENT THE CAPSTAN

Cross-References to Related Applications

The present application is a continuation in part of my pending application Ser. No. 44,510 filed June 8, 1970, the disclosure of which is incorporated herein by reference.

Summary of the Invention

This invention relates to a transducer system and particularly to tape record transducer machine in which a tape record medium follows a loop path about a capstan drive assembly and wherein a transducer head is disposed in scanning relation to the tape at the loop path. The motion of the tape past the transducer head is thus stabilized by means of the capstan. Advantageously a thin tape guide is interposed between a portion of the loop tape path and the periphery of the capstan so as to isolate the magnetic transducer head from any stray magnetic fields due to magnetization of the capstan. A particularly uniform motion of the capstan is achieved by the use of a unitary motor, flywheel and capstan assembly having a bearing at the outer end of the capstan.

The tape transport features are particularly advantageous for a video transducer system which may be built economically for home use or for educational purposes. The system may be used with endless loop and/or reel-to-reel tape cartridges.

It is therefore an important object of the present invention to provide an economical tape transducer system suitable for television signals and which provides an extremely steady tape motion at the transducing location.

A further object of the invention is to provide a tape transducer system capable of reproducing recorded video signals with sufficiently low flutter so that the reproduced signal may be utilized by an ordinary commercially available television receiver without alteration of the synchronizing circuits thereof.

Another object is to provide a tape transport including a capstan drive assembly for determining tape speed at a transducing location and for providing a particularly stable scanning relationship between the tape and the transducer head at such transducing location.

A further object of the invention is to provide a reversible capstan drive assembly for determining tape speed at a transducing location in each of respective opposite directions of motion of a record tape and wherein controlled tension of the record tape is maintained at the transducing location for each direction of tape movement.

Another and further object of the invention is to provide a novel endless loop cartridge transducer system wherein a precision type capstan drive assembly is engagable and disengagable with the tape record medium without the necessity for manual threading of the record tape.

A subsidiary object of the Invention is to provide such an endless loop cartridge transducer system wherein the operating tape path is free of sharp bends and yet wherein the transducer system accommodates an extremely compact cartridge configuration.

An important feature of the invention resides in the provision of a capstan drive assembly constructed for cooperation with a transducer head having a convex tape engaging face for optimum head-to-tape contact without the necessity for critical adjustment or excessive wear.

A further feature of the present invention resides in the provision of a magnetic transducer head especially suited for video signals and capable of operating with relatively high alternating current bias frequencies such as 10 megahertz or more.

Another feature resides in the provision of a longitudinal scanning type video transducer system capable of transducing television signals at relatively low tape speeds of the order of 30 inches per second.

A further feature of the invention relates to a continuous loop cartridge machine capable of transducing at least 30 channels on a quarter inch wide record tape without substantial cross talk between channels.

Still another and further feature of the invention resides in the provision of a shielding tape guide between the head and capstan, enabling the capstan to be made of an optimum material for bearing purposes and for dimensional stability, without noise being induced in the head due to magnetization of the material of the capstan.

Additional important objects and features of the invention reside in a tape transport for use in transducing any desired type of signal (including audio, instrumentation and data signals) giving exceptional steadiness of drive motion; in a tape capstan drive assembly for tensioning the tape at the transducer head by means of a capstan and rollers of special configuration; in a cartridge of a construction whereby a capstan and multiple idler rollers and the transducer head enter the interior during operation; in a cartridge from which a portion of the tape is automatically withdrawn for cooperation with a capstan, head and idler rollers; and/or in a tape drive where an isolated scanned portion of the record tape is supported closely adjacent the capstan along both sides of its path between capstan drive points.

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure.

Description of the Preferred Embodiments

Figures 1, 2, 3, 4:
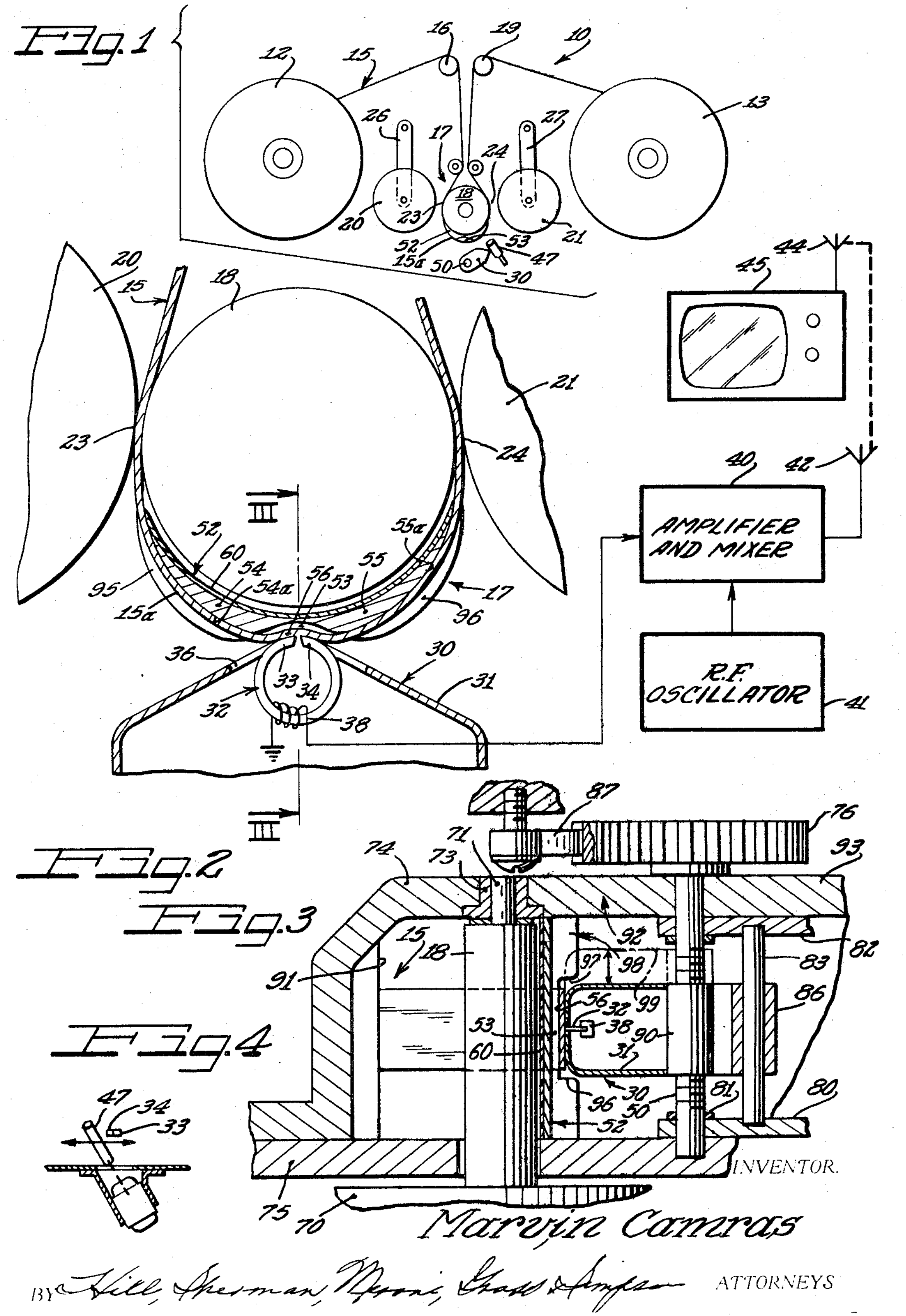
FIG. 1 is a top plan view of a tape transducer system in accordance with the present invention.
FIG. 2 is an enlarged somewhat diagrammatic horizontal sectional view of the head and capstan region of the tape transducer system of FIG. 1.
FIG. 3 is a somewhat diagrammatic partial vertical sectional view taken generally along the line III—III of FIG. 2.
FIG. 4 is a somewhat diagrammatic vertical sectional view of the head cleaning brush assembly of FIG. 1 and illustrating by means of a double headed arrow the path of movement of the tape contact surface of the magnetic transducer head relative thereto.

Referring to FIG. 1 there is illustrated a portion of a tape transducer system 10 which is shown as comprising a supply reel 12 and a take-up reel 13 coupled to a suitable tape transport means such as indicated in my aforesaid copending application filed June 8, 1970 and which may be of any suitable type commonly known to those skilled in the art. A record tape 15 is shown having an intermediate portion thereof threaded along a transducing path in the machine. The tape transport may be reversible so that each reel is alternately active as a supply reel and a take up reel during scanning of successive channels on the record tape.

The record tape 15 extends from the supply reel 12 about a guide roller 16, and then forms a record tape loop 15a about a capstan drive assemably 17 including a rotatable capstan 18. The record tape then extends about a guide roller 19 and to the take-up reel 13. A pair of friction faced pinch rollers 20 and 21 are shiftable to bias the tape into stable coupling relation with the capstan 18 at the opposite sides thereof during a transducing operation. Referring to the enlarged view of FIG. 2, tape loop *15a* is shown being pressed into firm contact with the capstan 18 at respective opposite sides of the tape loop such as indicated at 23 and 24. The pinch rollers 20 and 21 are shown as being freely rotatable on the lower ends of respective mounting arms 26 and 27 which mount the pinch rollers for movement from the retracted or threading condition illustrated in FIG. 1 to the operation or transducing condition as illustrated in FIG. 2.

As illustrated in FIG. 2, during transducing mode of operation, a transducer head 30 in placed in scanning relation with the record tape 15 at a region of the record tape loop *15a* intermediate the portions contacting the capstan 18 at 23 and 24. The transducer head 30 includes a housing 31 of magnetic shielding material and magnetic core 32 having tape contacting poles 33 and 34 projecting through an elongated slot 36 in the housing. The magnetic core 32 is provided with an electric winding such as indicated at 38 which during playback operation is connected with an amplifier and mixer component 40. By way of example, where a conventional composite television signal is recorded along the length of the magnetic record tape 15, the reproduced television signal may modulate a radio frequency carrier signal from oscillator 41, and the modulated signal may be supplied to an antenna 42 for radiation to a nearby antenna 44 of a conventional broadcast television receiver 45. As described in my pending application Ser. No. 528,934 filed Feb. 21, 1966 now abandoned, the disclosure of which is incorporated herein by reference, radio frequency oscillator 41 may have a carrier frequency tuned to a television channel that is not being used for television broadcast in the local region, for example channel 6 in the Chicago area. The disclosure of my copending application filed June 8, 1970 is incorporated herein by reference for further description of this arrangement and for an explanation of the head cleaning assembly indicated diagrammatically at 47 in FIG. 1 and shown in greater detail in FIG. 4.

Preferred head configurations are disclosed in my pending application Ser. No. 628,682 filed Apr. 5, 1967, the disclosure of which is incorporated herein by reference. It is found that because of the relatively low high-frequency losses of this head configuration, alternating current bias frequencies may be utilizing during recording, of about 10 megahertz or higher. Further with such a transducer head configuration, the system is capable of transducing recorded broadcast television signals at relatively low tape speeds of the order of 30 inches per second.

Referring to FIG. 3, head assembly 30 may be mounted on a threaded shaft 50 which in one mode is operable to shift the head assembly 30 axially for engagement with successive channels on the record tape, and in another mode is operable to accommodate swiveling of the head assembly to the inactive position shown in FIG. 1. Thus, in a preferred embodiment, the head assembly 30 "parks" in a tape threading position which is angularly displaced from the transducing position illustrated in FIG. 2.

FIGS. 2 and 3 illustrate a preferred capstan-head arrangement wherein the head assembly 30 cooperates with an unbacked span of the record tape. The capstan transducer assembly 17 includes a tape guide 52 having a recess at 53 defining a transducing region at which the record tape assumes a generally concave tape path configuration in conformity with the generally convex tape engaging face of the head assembly 30. The tape guide 52 further includes respective stationary tape guide elements 54 and 55 for supporting the tape loop 15*a* in advance of and beyond the transducing region 53. The stationary tape guide elements 54 and 55 provide respective stationary tape guide surfaces 54*a* 55*a* of generally arcuate configuration and of length in the direction of movement of the record tape at the record tape loop 15*a* so as to provide support for the record tape loop over substantially the entire length thereof which is out of engagement with the capstan. The tape guide surfaces 54*a* and 55*a* thus define generally arcuate tape path sections which are connected by the generally concave tape path section 56 at the transducing region 53.

The tape guide 52 further comprises a magnetic shielding member 60 which is interposed between the capstan 18 and the record tape loop 15*a* in the vicinity of the transducing region 53. The magnetic shielding member 60 may be formed of a thin sheet of magnetic material disposed in close conforming relation to a substantial portion of the periphery of the capstan 18 in the vicinity of the transducing region 53. By way of example the magnetic shielding member may be made of "Permalloy" having a composition of 4 percent molybdenum, 78 percent nickel and remainder iron and minor constituents. The tape guide elements 54 and 55 may be of thin electrically conductive material such as bronze.

With the illustrated configuration of the capstan drive assembly 17, the head assembly 30 can be of a conventional configuration with the record tape being supported solely by the magnetic transducer head 30 as it travels thereacross. Thus the head 30 is provided with a conventional convex tape contacting surface. Further it is found that if the capstan 18 is made of a preferred material such as steel, the magnetic domains within the capstan material will produce noise in the winding 38 in the absence of the shielding arrangement 52 of the illustrated embodiment. Preferably as indicated, sufficient clearance is provided between the shielding member 60 and the capstan 18 so as to avoid any contact during rotation of the capstan.

As indicated in FIG. 3, in a preferred arrangement, the capstan 18 in integral with the flywheel 70, and the flywheel 70 is rigidly fixed on the rotor shaft, a reduced diameter portion of the rotor shaft being indicated at 71 journalled in an upper bearing 73 supported by a rigid frame 74 which is fixedly secured to a mounting plate 75. The casing of the capstan drive motor is rigidly directly secured with the mounting plate 75, and the rotor shaft has a bearing below the rotor as will be explained in connection with FIG. 9, hereinafter. With this arrangement, a much steadier capstan motion is insured. Because of the steady motion thus achieved, the output from the magnetic head assembly 30 can be supplied directly to the conventional television receiver 45 without the need for special flutter compensation circuits. The amplifier and mixer component 40 may, however, contain suitable pedestal setting circuits for fixing the black level of the video signal and the like as disclosed in my pending application Ser. 649,256 filed June 27, 1967.

With respect to the threading of the illustrated embodiments, the embodiment of FIG. 1 may be taken as illustrating a conventional capstan without an upper bearing such as indicated at 73 in FIG. 3. Further, the head indexing means may be arranged generally as indicated in the ninth figure of my aforementioned copending application filed June 8, 1970, rather than including a gear 76 as in FIG. 3.

In the embodiment of FIG. 3, the head swiveling means may be coupled to a lever arm 80 which is freely rotatable relative to the lower portion of threaded shaft 50. A retaining washer 81 is shown as being fixed to the lower part of shaft 50 but rotatable with the shaft relative to the lever arm 80. A similar arm is indicated at 82 at the upper end of shaft 50 and a vertical guide rod is indicated at 83 which is rigidly fixed with the arms 80 and 82 for joint pivotal movement of these parts about the axis of shaft 50 in swiveling the head assembly 30 to its "park" position. The head assembly 30 has fixed therewith a cylindrical guide sleeve 86 which is slidable on the rod 83 during vertical indexing movement of the head assembly 30 under the control of gear 76. Detent means 87 defines successive angular positions of the threaded shaft 50 corresponding to successive channels on the record tape 15. The head assembly 30 is, of course, provided with a nut portion 90 in threaded engagement with the shaft 50 so as to provide the vertical indexing movement of the head assembly in response to rotation of the threaded shaft 50.

With the arrangement illustrated in FIG. 3, threading may be in an endwise direction through suitable openings in the frame 74 such as that indicated at 91. Alternatively, the detent 87 may be located at a different position and the diameter of gear 76 reduced so that a slot may be provided at a region 92 for edgewise threading of the record tape in the manner contemplated in the arrangement of FIG. 1. The upper support portion 93 for the shaft 50 would then of course be separate from the frame member 74 to provide the necessary threading slot at the region 92.

Referring to FIG. 2, as an alternative where convenient the radio frequency signal from component 40 may be conductively connected to the antenna terminals of the TV receiver 45.

Referring to FIGS. 2 and 3, it will be observed that the stationary tape guides 54 and 55 are provided with lateral flanges such as indicated at 95 and 96 in FIG. 2, below the tape path, having reference to the orientation of the system shown in FIG. 3. Similarly as indicated in FIG. 3, the stationary guides 54 and 55 may have opposite lateral guide flanges such as that indicated at 97, and having respective configurations corresponding to the configurations of the guides flanges 95 and 96, FIG. 2. The flanges 95–97 are contoured to provide an axial passage 98 which accommodates the indexing movement of the head assembly 30 to extreme axial positions such as an upper position indicated at 99, the horizontal cross section of the channel 98 generally conforming with the configuration of the recess 53 of the tape guide 52, as can be seen in FIG. 2. The passage 98 at the region between lateral flanges 95 and 96 accommodates movement of the head assembly 30 to a lower extreme position, comparable to the upper extreme position indicated at 99 in FIG. 3.

EMBODIMENT OF FIGS. 5–7

Figures 5, 6, 7, 8, 9, 10, 11:
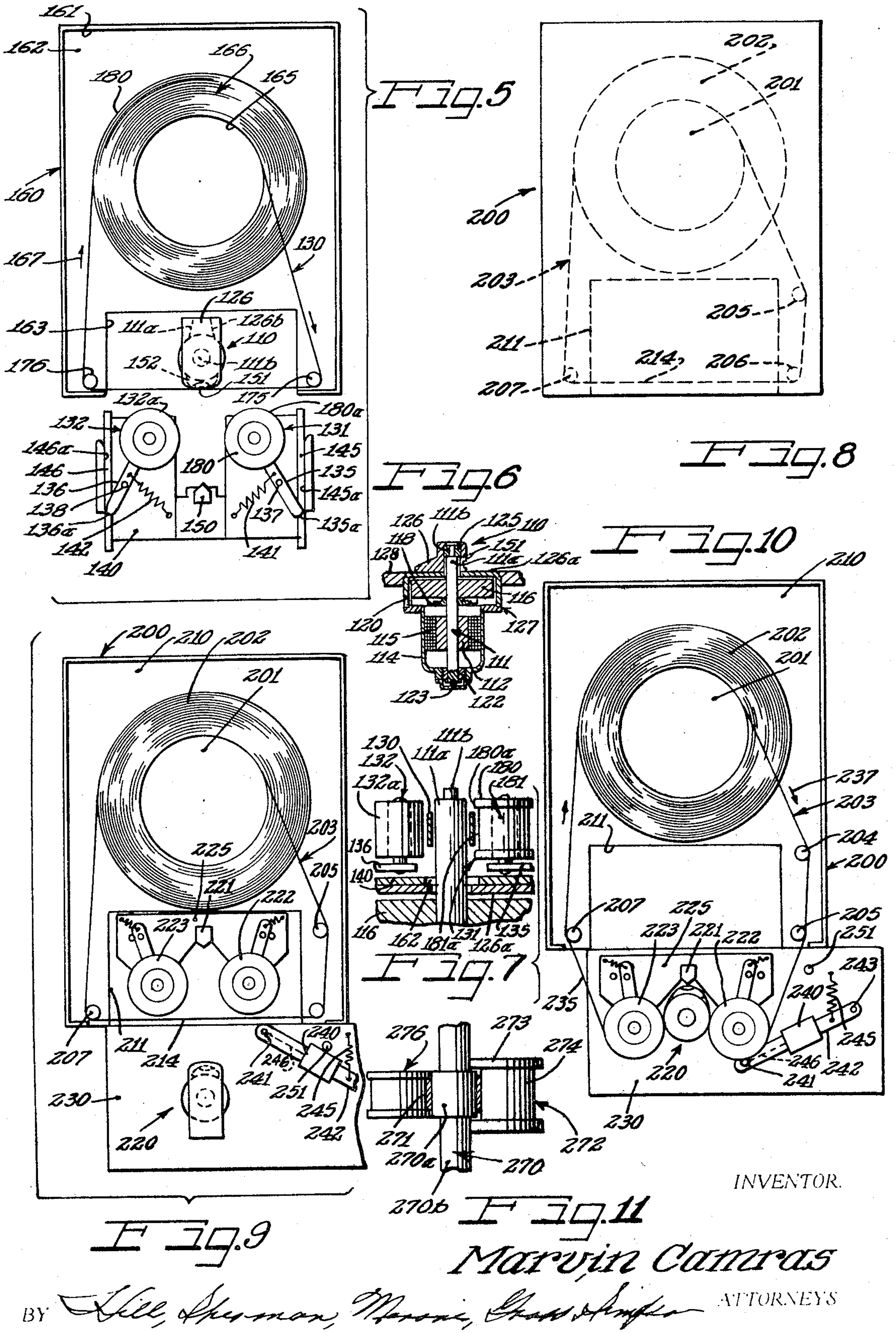
FIG. 5 is a somewhat diagrammatic plan view of an endless loop cartridge transducer system in accordance with the present invention.
FIG. 6 is a somewhat diagrammatic vertical sectional view illustrating a preferred capstan, flywheel and motor assembly for use with any of the embodiments herein.
FIG. 7 is a partial somewhat diagrammatic vertical sectional view showing a modified capstan drive configuration for use with any of the embodiments herein.
FIG. 8 is a diagrammatic plan view of an endless loop cartridge for use with the transducer system of FIGS. 9 and 10.
FIG. 9 is a partial somewhat diagrammatic top plan view of an endless loop cartridge transducer system, with the cartridge of FIG. 8 applied thereto.
FIG. 10 is a somewhat diagrammatic top plan view of the endless cartridge transducer system of FIG. 9, but showning the system in the operating condition of transducing signals with respect to the record tape.
FIG. 11 is a partial diagrammatic side elevational view showing a further modified capstan drive configuration for use with any of the embodiments herein.

Referring to FIGS. 5–7 there is illustrated a capstan drive assembly 110 which is essentially similar to the capstan drive assembly 17 of FIGS. 1–4. In this embodiment, however, a rotor shaft 111 is of a diameter to itself provide a capstan portion **111*a* at the end thereof remote from rotor 112. A casing for the motor is indicated at 114 and the stator is indicated at 115. A flywheel 116 is rigidly secured to the rotor shaft adjacent capstan portion 111*a*, and an exhaust impeller blade is indicated at 118 for rotation with the rotor 111 to exhaust air from the casing 114 through apertures 120. Suitable air intake apertures may be provided at the lower end of the casing 114 below stator 115 as viewed in FIG. 6. A bearing for the lower end of rotor 111 includes a sleeve 122 and a trush bearing 123. The bearing for the upper reduced end 111*b* of rotor shaft 111 may comprise a sleeve such as indicated at 125 carried by a frame 126, the bearing 125 and the adjoining part of frame 126 corresponding essentially identically to that shown at 73 and 74 in FIG. 3. In this embodiment, frame 126 includes an integral flange portion 126*a* which is rigidly secured with the motor casing 114 and forms a part of a rigid framework 127 mounting the rotating parts 111, 112 and 116. The framework 127 is shown as being secured in an aperture in a deck panel 128**.

Referring to FIG. 7, a record tape 130 is shown in section at opposite sides of the capstan **111*a*; idler rollers 131 and 132** being shown slightly spaced from the record tape and the record tape being shown with exaggerated thickness, for clarity of illustration.

Referring to FIG. 5, it will be observed that idler rollers 131 and 132 are shown as being carried by means of arms 135 and 136 which are pivotally mounted at 137 and 138 on a shiftable carriage 140. Tension springs 141 and 142 are coupled to the arms 135 and 136 so as to urge the arm 135 in the counterclockwise direction and so as to urge the arm 136 in the clockwise direction, as viewed in FIG. 5. In the illustrated retracted threading position of carriage 140, cam surfaces **145*a* and 146*a* of stationary tracks 145 and 146 for carriage 140 limit the pivotal movement of the arms 135 and 136 by virtue of the engagement of end portions 135*a* and 136*a* of the arms with the cam surfaces 145*a* and 146*a*. The tracks 145 and 146 may serve to guide the carriage 140 in its reciprocal movement between retracted and operating positions. The carriage 140 also mounts a magnetic transducer head 150 which may be identical in construction to the head assembly 30 of FIGS. 1–4 The head 150, however, may be mounted on the carriage 140 for linear movement from the retracted position shown in FIG. 5 to a transducing position in which the head 150 engages record tape 130 at a transducing region 151 of the capstan drive assembly 110 in the same way as illustrated in FIGS. 2 and 3 for transducer head assembly 30. The capstan drive assembly 110 may include a tape guide 152 identical to the tape guide 52 shown in FIGS. 2 and 3**.

In FIG. 5 there is illustrated an endless tape cartridge 160 which is suitably secured at a cartridge receiving location of the deck panel 128, FIG. 6. By way of example, the cartridge receiving means may be constructed as illustrated in the eleventh and twelfth figures of my copending application Ser. No. 831,352 filed June 9, 1969, the disclosure of which is incorporated herein by reference. The cartridge 160 is shown with its top cover removed, and may include a side wall 161, and a bottom wall 162 provided with an aperture 163. Within the cartridge is a reel element 165 having a coil 166 of the record tape 130 wound thereon and conventionally arranged so that the record tape may be driven along a transducing path in the direction of arrows such as indicated at 167. As indicated in FIGS. 5 and 6, transducing region 151 of the capstan drive assembly is laterally open to the record tape 130 so that as the carriage 140 is advanced, guide rollers 131 and 132 will engage the record tape 130 and wrap the same about the capstan **111*a*, the mounting arms 135 and 136 for idler rollers 131 and 132 in the transducing position of the carriage 140 being clear of engagement with cam surfaces 145*a* and 146*a*, so that the tension springs 141 and 142 are fully effective in pressing the idler rollers 131 and 132 against opposite sides of the tape loop in the same manner as illustrated for idler rollers 20 and 21 in FIG. 2. It will be understood that the transducing path of the record tape 130 extends from the inner side of coil 166 to a guide pin 175 and then about approximately 180° of the periphery of idler roller 131, then about the periphery of capstan drive assembly 110 over an arc of approximately 240°, then around about 180° of the periphery of roller 132, and then about the guide pin 176 of the cartridge and from there to the outer periphery of coil 166. The frame 126 may be undercut as indicated at 126*b* in FIG. 5 to accommodate the 240° wrap of the record tape about the capstan drive assembly 110**.

As the carriage 140 is retracted from the transducing position, the idler rollers 131 and 132 maintain the record tape 130 in driven engagement with the capstan **111*a*. As the pressure rollers 131 and 132 are retracted and move past a position where the tape is wrapped about approximately 180° of the capstan drive assembly 110, the ends 135*a* and 136*a* of the mounting arms 135 and 136 engage the cam surfaces 145*a* and 146*a* so as to limit inward pivotal movement of the pressure rollers 131 and 132 as the carriage 140 moves to the fully retracted position shown in FIG. 5. Thus as indicated in FIG. 5, in the retracted position of carriage 140, the separation between the peripheries of idler rollers 131 and 132 is approximately equal to the diameter of capstan 111*a***.

The characteristics of an endless tape cartridge are such that the continued drive of the tape 130 by means of the capstan **111*a* as the carriage 140 is retracted, applies tension to the tape because of the greater winding diameter of the outer take up periphery at 180 of the record tape coil 166. Thus, providing for the retraction of the carriage 140 whenever the drive motor for the capstan is deenergized, without applying any braking action to the capstan, enables the automatic restoration of the cartridge to the initial loading condition for the tape path as indicated in FIG. 5. Conversely, as the carriage 140 is moved to the transducing position, there is sufficient looseness in the coil 166 of record tape on the reel 165 to enable the record tape 130 to be moved to the transducing path position wrapped about rollers 131 and 132 and capstan 111*a*** as previously described.

As illustrated in FIG. 7, an important concept of the present invention is to provide for driving engagement between the capstan **111*a* and at least one of the idler rollers 131 and 132, such that the loop of tape is placed under a substantial tension where it spans the transducing region 151, corresponding to the transducing region 53 of FIG. 2. In the embodiment of FIG. 7, idler roller 131 is provided with upper and lower enlarged diameter rim portions such as indicated at 180. In one example which operates successfully, the diameter of the end portions 180 exceeds the diameter of the periphery of the central portion 181 of the roller 131 by an amount equal to more than twice the thickness of the record tape 130, so that frictional peripheral surfaces of the roller 131 such as that indicated at 180*a* in FIG. 5 and such as those indicated at 180*a* and 181*a* in FIG. 7 are simultaneously in pressure engagement with the surface of capstan 111a and with the magnetizable surface of the record tape 130. The idler roller 131 is driven by the capstan and tends to drive the record tape 130 at a slower speed at the supply side of the capstan drive assembly 110 than the surface speed of the capstan 111*a*, the capstan 111*a* having a metal peripheral surface engaging the inactive side of the record tape 130. (The inactive side of the record tape may be of a Mylar material with a lubricant layer containing graphite.) The idler roller 132 may be provided with a frictional peripheral surface 132*a*, FIG. 5, which engages the active face of the record tape 130, and preferably is sufficiently resilient so that portions thereof are deformed into driving engagement directly with the capstan 111*a*. It has been found by experiment that such a roller 132 at the take-up side of the tape loop tends to drive the record tape at a speed corresponding more closely to the surface speed of the capstan 111*a* than where the grooved roller 131 is used, producing the desired tension in the tape loop between idler rollers 131 and 132. As indicated in FIG. 7 the spacing between rim portions 180 is wider than the tape 130**, allowing for some lateral displacement of the tape.

Summarizing the operation in the embodiment of FIGS. 5–7, the cartridge 160 is loaded into a cartridge receiving space of the machine with the aperture 163 in the bottom wall 162 of the cartridge accommodating the capstan drive assembly 110. The carriage 140 is then shifted to an operating or transducing position with the idler rollers 131 and 132 pressing the record tape 130 against opposite sides of capstan **111*a*, in generally the same way as illustrated in FIG. 2 for the previous embodiment. As in the embodiments of FIGS. 1 and 2, and of FIG. 10, the centers of idler rollers 131, 132 in operating position are preferably moved beyond the center of the capstan 111*a* to provide more than a 180° wrap of the tape about the capstan drive assembly 110. During transducing operation, rims 180 of frictional material on idler roller 131 tend to cause a reduction in the surface speed of the record tape at the entering drive point in comparison to the surface speed of the tape at the departing drive point defined by idler 132. This is found to be true even though the idler roller 132 has a greater axial extent than the width of the tape 130, as is shown in FIG. 7, and has a periphery 132*a* of sufficient resiliency in comparison to the pressure exerted thereon by spring 142, so that the idler roller 132 is positively driven by direct engagement with the capstan 111*a***.

Whenever the cartridge is to be unloaded the driving motor for capstan **111*a* is deenergized, and the carriage 140 is simultaneously moved to the retracted position shown in FIG. 5, the idler rollers 131 and 132 maintaining the tape 130 in driving engagement with the capstan 111*a* as long as possible. (The capstan 111*a* continues to rotate during movement of the cartridge due to the momentum of the flywheel 116.) The driving of the record tape 130 during retraction of the carriage 140 serves to return the record tape to the loading path configuration shown in FIG. 5 wherein the tape is essentially taut and straight at its path between the guide pins 175 and 176. The cartridge 160** is thus automatically placed in proper condition for unloading from the machine, and for storage and subsequent use.

EMBODIMENT OF FIGS. 8–10

FIG. 8 illustrates an endless loop tape cartridge 200 including a reel 201 mounting a coil 202 of a record tape 203. A portion of the record tape extends from the inner side of the coil 202 about guide pins 205, 206 and 207, and back to the outer periphery of the coil 202. As best seen in FIGS. 9 and 10, a bottom wall 210 of cartridge 200 is provided with a rectangular aperture 211. The cartridge when released from a transducer system has a length of the record tape 203 extending along a loading path such as indicated at 214 in FIG. 8 directly between guide pins 206 and 207.

FIG. 9 illustrates cartridge 200 loaded into a cartridge receiving position of a transducer system including a capstan drive assembly 220, a cooperating transducer head 221, and idler rollers 222 and 223. The transducer head 221 and idler rollers 222 and 223 are mounted on a shiftable carriage 225 which is reciprocally movable from a loading position as indicated in FIG. 9 to an operating position as indicated in FIG. 10. The idler rollers 222 and 223 may be pivotally mounted as in the embodiment of FIGS. 5–7. The construction of the transducer head assembly 221 may conform to that of the head assembly 30, and the construction of the capstan drive assembly 220 may be similar to that described in detail with reference to FIGS. 5–7. The cooperative relationship between the capstan drive assembly 220 and the transducer head assembly 221 may correspond substantially to that illustrated in FIGS. 2 and may correspond to that described in detail with reference to FIGS. 5–7. As indicated in FIG. 10, carriage plate 225 may slide over the stationary panel 230 carrying the capstan drive assembly 220. As the carriage 225 is shifted, idler rollers 222 and 223 engage the tape 203 and shift the tape to the transducing path indicated at 235 where the record tape extends about approximately 180° of the idler roller 222 and then more than 180° about the capstan drive assembly 220 and then about the idler roller 223 over an arc of about 180°, the direction of tape movement being indicated by arrows such as 237.

During retraction of the carriage 225 back to the position shown in FIG. 9, the idler rollers 222 and 223 maintain the tape in driven engagement with the capstan of the drive assembly 220 during a portion of the movement of the carriage 225. The idler rollers 222 and 223 then leave pressure engagement with the capstan drive assembly 220, so that the tape is no longer driven by the capstan drive assembly. If the momentum of the reel 201 of the cartridge 200 is insufficient to return the tape 203 to the loading path 214, an auxiliary motor may be provided as indicated at 240 for driving engagement with a tape drive element 241 during retraction of the cartridge 225. By way of example, drive element 241 may be carried by means of a pivotal mounting arm 242 pivotally secured to panel 230 as indicated at 243 in FIG. 10 and urged in the clockwise direction by means of a tension spring 245. Thus, as the carriage 225 is retracted, drive element 241 maintains driving engagement with the record tape 203 so as to drive the record tape in the direction of the arrow 237 and thereby return the tape to the initial loading path 214. During normal transducing operation, motor 240 may be decoupled from drive element 241, or alternatively the arm 242 may be held at an extreme counterclockwise limit where the drive element 241 is out of engagement with the record tape 203 until such time as the carriage 225 is to be retracted. By way of example, the motor 240 may be coupled with the drive element 241 by means of gear train diagrammatically indicated by means of dash line 246.

The idler rollers 222 and 223 may have any of the configurations disclosed herein for the purpose of tensioning the tape loop wrapped about the capstan drive assembly 220. In any of the embodiments, the transducer head such as 221 may be shifted axially of the capstan drive assembly generally as indicated in FIG. 3 for selective scanning of successive laterally offset channels on the record tape.

Summarizing operation of the embodiment of FIGS. 8–10, cartridge 200 is loaded at a suitable cartridge receiving space of a transducer system as indicated in FIG. 9, a lower aperture 211 of the cartridge accommodating transducer head 221 and idler rollers 222 and 223. The carriage 225 is then shifted to engage the record tape 203 with the capstan drive assembly 220 as illustrated in FIG. 10, the arm 242 together with its drive element 241 pivoting from the position shown in FIG. 9 to the position shown in FIG. 10 by virtue of its engagement with the record tape and the idler roller 222 acting on the opposite side of the record tape from the drive element 241. At the completion of a transducing operation, carriage 225 is retracted from the position shown in FIG. 10, the momentum of the capstan 220 serving to continue to drive the record tape 203 in the direction of arrow 237 during a part of the retracting movement of the carriage 225. If required, a separately energized drive element such as 241 may engage the record tape 203 during the retracting movement of the carriage 225, for example in cooperation with idler roller 222 so as to continue driving of the tape 203 in the direction of arrow 237 until the carriage 225 is substantially fully returned to the retracted position indicated in FIG. 9, a stop for the arm 242 being indicated at 251 so as to retain the drive element 241 suitably spaced from the loading path 214 of the tape 203, so as to insure clearance for the tape as the cartridge is loaded and unloaded from the transducer system.

EMBODIMENT OF FIG. 11

In the embodiment of FIG. 11, there is illustrated a rotor shaft 270 corresponding to the rotor shaft 111 of FIGS. 6 and 7, provided with an enlarged capstan portion **270*a* for receiving the record tape 271 in coupling relation as in the other embodiments hereof. Idler roller 272 may correspond substantially identically to the idler roller 131 of FIGS. 5–7, except that the difference in diameters between portions 273 and 274 thereof may be somewhat greater in view of the fact that the rim portions such as 273 engage a reduced diameter portion 270*b* of the rotor shaft 270. The configuration of the idler roller 276 at the take-up side of the tape loop is essentially identical to the configuration of the idler roller 131, this type of roller tending to drive the record tape 271 at a speed slightly slower than the surface of the capstan portion 270*a*. Because the rim portion 273 engages a reduced diameter portion 270*b* of capstan 270, the idler roller 272 at the supply side of the tape loop drives the tape at a further reduced speed in comparison to the surface speed of the capstan portion 270*a*, with the result that a substantial tension is exerted on the tape loop. The configuration of FIG. 7 is preferred in comparison to the configuration of FIG. 11 to the extent that the configuration of FIG. 7 does not require a special enlarged diameter portion of the rotor shaft serving as the tape contacting capstan portion, as is required in the embodiment of FIG. 11**.

EMBODIMENT OF FIGS. 12 AND 13

Figures 12, 13, 14, 15, 16, 17, 18:
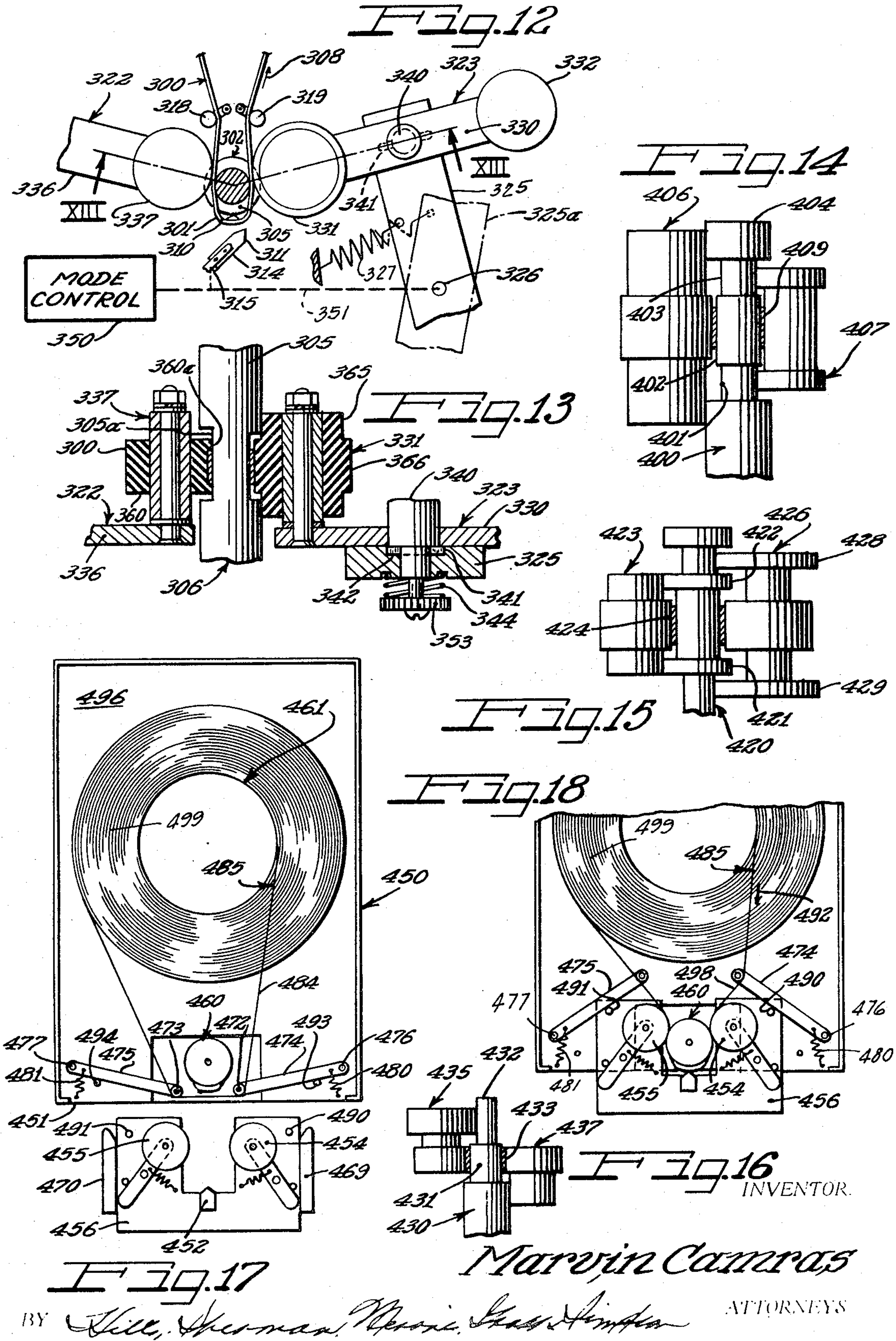
FIG. 12 is a somewhat diagrammatic partial plan view illustrating a reversible capstan drive configuration in accordance with the present invention, and particularly adapted for use with reel-to-reel transducer apparatus.
FIG. 13 is a somewhat diagrammatic vertical sectional view taken generally along the line XIII—XIII of FIG. 12.
FIG. 14 is a diagrammatic partial side elevational view illustrating a further capstan drive configuration.
FIG. 15 is a partial diagrammatic elevational view showing still another capstan drive configuration.
FIG. 16 is a partial diagrammatic side elevational view also showing a further modified capstan drive configuration.
FIG. 17 is a somewhat diagrammatic plan view illustrating an endless loop cartridge transducer system in accordance with the present invention.
FIG. 18 is a partial diagrammatic plan view illustrating the endless loop cartridge transducer system of FIG. 17 shifted into the operating condition.

The embodiment of FIGS. 12 and 13 may represent a transducer system similar to that illustrated in FIGS. 1–4 wherein a record tape 300 has a loop 301 thereof wrapped about a capstan drive assembly 302. As in the embodiment of FIGS. 1–4, the drive motor driving capstan portion 305 of rotor shaft 306 is reversible so as to selectively drive the tape in respective opposite directions at the desired transducing speed. In FIGS. 12 and 13, it is contemplated that the capstan motor is energized so as to drive the record tape 300 in the direction of arrow 308. The capstan drive assembly 302 may be identical to the capstan drive assembly 110 of FIGS. 5–7 and include a tape guide 310 for cooperation with a transducer head assembly 311 in the same way as illustrated in FIGS. 2 and 3. It is contemplated, simply by way of example, that the transducer head assembly 311 may be mounted for pivotal and indexing movement by means of a threaded shaft 314 corresponding to shaft 50 of FIG. 3 and guide frame 315 corresponding to parts 80,82 and 83 of FIG. 3. Guide elements are indicated at 318 and 319 for guiding tape 300 along a desired transducing path. Tape 300 may be carried in a cassette type cartridge having a conventional two reel arrangement, with guide elements 318 and 319 being movably mounted in a manner analogous to the movable guide pins of the embodiment of FIGS. 17 and 18 to be described hereinafter. In this event, guide elements 318 and 319 would each be provided with an extension finger at the inner side of the tape, so that the tape could be returned to an initial threading configuration such as that indicated in FIG. 17. Of course, the head assembly 311 together with the idler roller assemblies 322 and 323 may be mounted for reciprocation on a carriage generally as indicated in FIG. 5, for example.

Referring to FIG. 12, it will be observed that the idler roller assembly 323 includes a mounting arm 325 pivotal at 326 and urged in the counterclockwise direction by means of a tension spring 327. Mounting arm 325 carries a cross piece 330 which in turn mounts a pair of idler rollers including a higher speed drive idler roller 331 and a lower speed drive idler roller 332. Idler arm assembly 322 is essentially identical to idler assembly 323 and includes a cross piece 336 rotatably mounting a lower speed driving idler roller 337 which may be identical to the idler roller 332 of assembly 323. When it is desired to reverse the direction of movement of the record tape 300, cross piece members 330 and 336 are pivoted through 180°, so that idler roller 332 is in operative relation with the tape loop 301 at the right hand side as viewed in FIG. 12, while a high speed drive idler roller at the opposite end of cross piece member 336 is in driving engagement with the tape loop 301 at the left side of the capstan drive assembly 302 as viewed in FIG. 12. The idler roller on cross piece member 336 which is not shown in FIG. 12 may correspond identically to the idler roller 331 of assembly 323, rollers 331 and 337 being shown in detail in FIG. 13. In order to reverse the direction of movement, mounting arm 325 is pivoted in the clockwise direction to a position such as indicated at 325*a* in dot dash outline in FIG. 12 where the idler rollers are out of engagement with the capstan drive assembly. For manual interchange of the idler rollers 331 and 332, a knob 340 may be manually grasped and lifted to remove a pin 341 fixed to knob 340 from a cooperating conforming recess 342 of mounting arm 325. A compression spring is indicated at 344 for normally retaining the pin 341 locked within recess 342. With the pin 342 above the level of mounting arm 325, knob 340 may be rotated through 180° to interchange the rollers 331 and 332, where upon release of the knob 340 returns the pin 341 into its locking relation to recess 342 (but reversed in orientation). For manual mode, release of the knob 340 will allow the spring 327 to urge the mounting arm 325 in the counterclockwise direction, now urging roller 332 into coupling relation to the capstan drive assembly 302. An entirely similar procedure is followed in reversing the assembly 322 to present the higher speed idler roller (not shown) for driving engagement with the capstan 305.

For automatic operation, a mode control component 350 may be provided having mechanical coupling as represented by the dash lines such as 351 with the transducer head assembly 311 and with the idler assemblies 322 and 323, so that during an automatic reversal mode of operation, the mounting arms such as 325 will be shifted to the positions indicated at 325*a*, and gears such as indicated at 353, FIG. 13, automatically lifted to release pins such as 341 and then rotated through 180° to reverse the respective pairs of idler rollers, whereupon the compression springs such as indicated at 344 are allowed to return the pins such as 341 to the locking condition relative to recesses such as 342.

While the configuration of the high and low speed idler rollers may conform with any of the examples given herein, as a further example, capstan 305 is shown in FIG. 13 with a reduced diameter portion 305*a* receiving record tape 300, the roller 337 including a peripheral portion 360 of the same cylindrical configuration as shown for the idler roller 132 in FIG. 7. Idler roller 337, however, is shown resiliently urged against the capstan so as to deform a portion of the periphery 360 instantaneously engaging the tape, and thus to maintain axially outer portions such as 360*a* in direct driving engagement with the reduced diameter portion 305*a*. This is the same configuration as is present for the case of the idler roller 132 when in the operative transducing condition.

Idler roller 331 provides a step-up drive coupling between the capstan 305 and the record tape 300 by virtue of contact of smaller diameter portions 365 with the larger diameter of the capstan 305, and a larger diameter central portion 366 in driving engagement with the record tape 300. Thus a higher speed idler roller such as 365 is provided at the take-up side of the tape loop 301 for tending to drive the tape at a higher speed than an idler roller such as 337, thereby providing the desired degree of tension on the tape loop at the transducing region of tape guide 310 as in the other embodiments described herein.

Summarizing the operation of the embodiment of FIGS. 12 and 13, during transducing operation with the tape 300 moving in the direction of arrow 308, a higher speed idler roller 331 engages tape loop 301 at the takeup side of the loop so as to tend to drive the record tape at a higher surface speed than the surface speed of the capstan reduced diameter portion 305*a*. If the direction of operation of the capstan drive assembly 302 is to be reversed, idler assemblies 322 and 323 may be manually shifted to positions such as indicated at 325*a*, whereupon the knob 340 may be pulled upwardly, FIG. 13, against the action of spring 344 and rotated 180° to interchange rollers 331 and 332, a similar knob being manipulated to replace lower speed idler 337 with a higher speed idler of assembly 322. Where a high speed forward or rewind mode is desired, mode control 350 may be operable in such mode to pivot head assembly 311 to the inactive position indicated in FIG. 12 and to shift assemblies 322 and 323 to positions such as indicated at 325*a*, automatically. Guide pins such as 371 and 372 may be associated with the respective tape guide elements 318 and 319 for automatically restoring the tape to an initial threading condition, where the system of FIGS. 12 and 13 is associated with a two-reel cartridge, or other automatic threading arrangement. Such operation of the guide pins 371 and 372 will be readily understood from the description of a similar arrangement for FIGS. 17 and 18.

EMBODIMENT OF FIG. 14

In FIG. 14, a rotor shaft 400 is indicated having different diameter portions 401, 402, 403 and 404 for driving cooperation with respective idler rollers 406 and 407. Slower speed idler roller 407 is similar to the idler roller 272 of FIG. 11, while roller 406 provides a step up drive coupling from capstan portions of large diameter such as 404 to record tape 409, analogous to the step up drive coupling provided by the roller 331 of FIG. 13. This capstan and idler roller configuration may be provided in any of the embodiments shown herein for tensioning the tape loop at the transducer head.

EMBODIMENT OF FIG. 15

FIG. 15 illustrates a further capstan and idler roller configuration in which rotor shaft 420 is provided with different diameter portions such as 421 and 422 for cooperating with an idler roller 423 to tend to drive record tape 424 at relatively high speed, while a second idler roller 426 is provided with relatively large diameter portions 428 and 429 cooperating with relatively reduced diameter portions of capstan 420 so as to tend to drive the record tape 424 at a relatively slower speed. This embodiment, also, may be utilized in connection with any of the systems referred to herein.

EMBODIMENT OF FIG. 16

FIG. 16 illustrates a rotor shaft 430 with successively reduced diameter portions 431 and 432 providing respectively a contacting surface for the record tape 433 and a driving surface for a relatively lower speed idler 435 which tends to drive record tape 433 at relatively low speed in comparison with the higher speed idler 437. This embodiment, also, may be applied to any of the systems referred to herein.

EMBODIMENT OF FIGS. 17 AND 18

FIGS. 17 and 18 illustrate an endless tape cartridge 450 having an open end as indicated at 451 for receiving a transducer head 452 and idler rollers 454 and 455 of carriage 456, as indicated in FIG. 18. Capstan drive assembly 460 and tape reel assembly 461 may conform with the details explained in connection with FIGS. 5–7, for example. Stationary members 469 and 470 may provide cam surfaces for the pivotally mounting arms of idler rollers 454 and 455 corresponding to the cam guide surfaces 145*a* and 146*a* in FIG. 5, and members 469 and 470 may also provide guidance for the reciprocal movement of carriage 456, this function being performed by tracks 145 and 146 in FIG. 5.

As seen in FIG. 17, tape guide elements 472 and 473 are carried on mounting arms 474 and 475 which are pivotally mounted at 476 and 477 within cartridge 450. Tension springs 481 and 480 urge arms 475 and 474 respectively in a clockwise and in counterclockwise direction so as to provide a threading tape path as indicated at 484 for record tape 485.

As carriage 456 is advanced to the operative transducing position indicated in FIG. 18, idler rollers 454 and 455 engage guide elements 472 and 473 so as to begin moving the same toward the inward positions indicated in FIG. 18. Pins 490 and 491 then engage arms 474 and 475 to complete the inward movement of the arms to the positions shown in FIG. 18. Conversely, as the carriage 456 is retracted, the arms 474 and 475 return to the initial positions indicated in FIG. 17 which may, for example, be determined by the positions of respective stop pins 493 and 494. Because the capstan of the drive assembly 460 tends to continue rotation to drive the tape in the direction of arrow 492, FIG. 18, during retraction of carriage 456, the tape 485 will reliably assume the initial threading path indicated at 484 in FIG. 17 with clearance from the capstan drive assembly 460 to facilitate loading and unloading of the cartridge 450 as in the previous embodiments. Where carriage plate 456 slides on top of bottom wall 496 of cartridge 450, the aperture in the bottom wall 496 (not shown) need only be sufficiently large to accommodate the capstan drive assembly 460.

Summarizing operation of the embodiment of FIGS. 17 and 18, cartridge 450 is loaded over capstan drive assembly 460 by means of an aperture in bottom wall 496 of the cartridge, for example in the manner illustrated in FIG. 5. As carriage 456 advances into the cartridge to the transducing position indicated in FIG. 18, arms 474 and 475 carrying guide elements 472 and 473 shift to the position shown in FIG. 18 to provide a relatively smooth transducing path for tape 485 as indicated at 498 in FIG. 18. This arrangement avoids the relatively sharp ends in the transducing path of the system of FIG. 5, for example.

The capstan drive assembly 460 and idler rollers 454 and 455 may have any of the configurations referred to herein.

GENERAL DISCUSSION OF THE ILLUSTRATED EMBODIMENTS

The illustrated tape transport embodiments are especially advantageous for video recording and reproduction, for example of broadcast television signals. The tape transport may be built economically for home use or for educational purposes. It is also suitable for instrumentation, audio and other applications where extremely steady drive is required. Special advantages of the illustrated transports include: (1) the flutter is so low that the signal may be utilized by an ordinary television receiving set without alteration of the sync circuits. This allows a video tape player to play through any television set with no connections except to the antenna terminals of the television set, or alternatively the video tape player unit can radiate a weak signal that is picked up by the set with no interconnection at all. (2) a continuous loop cartridge with a large number of parallel tracks (for example 30) gives rapid access to many separate programs. For example, thirty "single concept" educational features may be recorded on a tape one fourth inch wide. Each feature plays over and over again, until a different feature is selected by moving the head laterally to a different track. A video juke box can be implemented in the same way. (3) the cartridge can display a long continuous program by automatically stepping to the next track whenever the tape loop completes a passage. See for example my U.S. Pat. No. 2,857,164. (4) a cartridge is very convenient for loading the tape recorder and storing and protecting the records. (5) the cartridge drive is very simple and can be built precisely as a motor assembly on which the head and pressure roller carriage is mounted, this constituting practically the entire tape transport.

The steadiness of the drive is attributable to the unitary assembly of motor, flywheel and capstan, which is treated as a unit, being finish-ground and dynamically balanced as one piece and suspended between bearings at the extremes, including a bearing overlying the capstan as best illustrated in FIG. 6. (In conventional drives the capstan is cantilevered beyond its bearings and runs much less precisely both initially and after wearing.) The tape at the transducer head runs over a tape guide having a crescent shaped section fitted against the capstan. The crescent guide best seen at 52 in FIG. 2 supports the tape practically completely so that it cannot vibrate. The crescent guide allows the tape to be wrapped about the transducer head with substantially no unsupported tape, and allows the head to move laterally for channel selection. It also provides for magnetic shielding as indicated at 60 in FIG. 2 that prevents pick-up by the head of magnetized portions of the capstan. The crescent guide is attached to the base of the capstan drive assembly, or to the top bearing holder such as at 74, FIG. 3, or to both. The crescent guide may be part of a casting that includes the upper bearing and the base on which the transducer head, pressure rollers and so on are mounted. Bronze would be a suitable material. If a separate piece, the crescent guide can be made of brass. A hard surface such as chromium plating is preferred on the parts of the crescent guide that support or guide the tape. The transducer head, including a shiftable mount, and the idler rollers are preferably made a part of the above subassembly which fits into an opening of the recorder deck.

The basic motor-flywheel-capstan assembly can be used with tape that is fed from a supply reel to a take-up reel, either with separate reels as in FIG. 1, or in cassette form. If multiple parallel tracks are used with the two reel versions, reversible operation is preferred so that alternate tracks are playable in opposite directions. The supply and take-up shafts are coupled with suitable driving and tensioning devices.

When the basic assembly is used with an endless loop cartridge, only the base plate with an engaging system for the cartridge is required for the mechanical part of the recorder. Operation in only one direction simplifies the motor and the tensioning system.

In one version of cartridge as indicated in FIG. 5 the tape remains within the cartridge but its path is changed from a loading condition to an operating condition after the cartridge is placed on the machine. The reverse procedure takes place before the cartridge is removable.

In another version such as that indicated in FIGS. 8–10, a length of tape is removed beyond the cartridge for threading about the capstan drive assembly. With this version the cartridge is more compact since it does not have to provide space for the capstan. For unloading, the tape is drawn back into the cartridge and replaced in threadable form before the cartridge can be removed.

The unitary motor-flywheel-capstan system of FIG. 6 is made from a standard motor by replacing the upper end-ball with the expanded portion as shown. The lower ring of the expanded portion is attached securely to the to the motor frame. The upper part may be a casting, machined for a close fit with the lower ring, and bolted to it after the rotor assembly is inserted. The rotor consists of an extra heavy shaft preferably of hardened steel upon which are pressed the armature, a fan, and the flywheel-capstan. The capstan surface is preferably chrome-plated.

The crescent guide is shaped of thin metals such as bronze. It may be cast and machined, or may be bent from sheet material to the shape as illustrated in FIGS. 2 and 3. The crescent guide provides a guide groove providing a smooth continuous path for the tape from the capstan past the transducer head and back to the capstan with no abrupt bends. This is best shown in FIG. 2. It is fastened to base plate 75 and to frame 74, for example, as shown in FIG. 3.

A reasonable tension should be developed in the tape where it contacts the head, as for example 1 to 4 ounces for tape on quarter inch wide. To achieve these tensions while maintaining lower tension on the supply and take-up portions of the tape, the resilient idler roller at the supply side of the tape loop is made with a larger diameter at the portions 180 that are beyond the tape as shown in FIG. 7, while the roller 132 on the take-up side is of constant diameter. For example, an increased diameter of about 0.003 inch gave good results with a pressure roller diameter of about 1 inch, a capstan diameter five-eighths inch, and a tape of about 0.001 inch thickness. More than 0.003 inch difference in diameter will increase the tension in the crescent portion, while less difference will decrease the tension.

With respect to the embodiment of FIG. 7, for example, the peripheral surface portion **181*a* drives the tape because it is made of rubber-like material having a high coefficient of friction, while the tape slips at the surface of the capstan which has a lower coefficient of friction. At idler roller 132, the tape tends to run more nearly at the capstan surface speed even if the idler roller 132 is pressed so that its overhanging edges make good driving contact with the capstan. The slight differential speed tendency between the capstan idler rollers such as 131 and 132 keeps the tape at the desired tension while maintaining a smooth flutter-free drive. The provision of tension at the capstan drive assembly is particularly important for endless loop type cartridges, since normally in such cartridges, the tape at the supply and take-up sides of the capstan drive assembly is essentially free or has a very low tension. With the idler roller tensioning systems, it is preferred that one idler roller definitely control the tape speed, the other idler roller, such as the idler roller 131 in the embodiment of FIG. 7**, being designed to provide slippage which is sufficient to maintain the desired degree of tension.

Referring to the embodiment of FIGS. 17 and 18, it will be observed that operating tape path for the tape extending exterior to coil 499 from the inner side of the coil through the transport to the outer side of the coil, has a length approximately equal to the length of the threading tape path shown at 484, FIG. 17, because of the shifting of guides 472 and 473. By proper arrangement of the guides, substantial change in the condition of coil 499 is avoided during movement of idler rollers 454 and 455 to the operating position.

The guides 472 and 473 may alternatively clamp the tape against sidewall members when in the released condition as for example against a lid at opening 451.

A locking arrangement prevents the cartridge from being released until the carriage is free and the tape is in the loading position. For example in FIG. 18 the carriage 456 overlays the bottom wall of the cartridge, preventing it from disengagement until it assumes the configuration of FIG. 17.

With respect to the showing of the crescent guide 52 in FIG. 3, the spacing between the upper and lower guide flanges such as 96 and 97 should confine the tape to prevent any substantial lateral movement at the transducer head. The clearance shown in FIG. 3 is exaggerated, the correct degree of clearance being understood in the art.

The various guide pins such as 175 and 176 in FIG. 5 may be flanged for side-guidance of the tape.

Referring to the endless loop cartridge embodiments, as the cartridge is retracted to the loading position, the continued driving of the record tape applies tension to the run of the tape between the inner and outer sides of the coil because of the greater winding diameter of the outer takenup periphery of the coil which thus takes up slack in the exposed run of tape. The endless coil configuration is such, however, that there is still sufficient looseness or slack in the coil of record tape on the reel to enable the record tape to be moved to a transducing path which is of greater length than the initial threading or loading path of the record tape (such as the threading path indicated at 214 in FIG. 9).

MODIFICATIONS

It may be noted that as an alternative, for example, idler roller 132 may be narrower than the width of the tape or be made less resilient even though wider than the tape, so as to press only against the back of the tape, in which case more pressure is needed for good driving action.

In some cases, the crescent tape guide such as the non-magnetic parts 54 and 55 in FIG. 2, may space the head sufficiently from the capstan to reduce interference due to a magnetized capstan, in which event the shielding member 60 may be omitted.

It may be noted that the cartridges shown herein need not be operated at slow speeds such as 30 inches per second, since the cartridges operate well at 120 inches per second, for example. The endless tape cartridges are provided with suitable guides for peeling the tape from the inner periphery of the coil and for guiding the tape along the general path shown. The reels or hubs such as 165 and 201 are tapered radially inwardly with respect to the direction toward the bottom wall of the cartridge, to have the shape of an inverted cone frustrum.

Proper tension of the tape at the transducer head may also be obtained by increasing the tape tension outside of the loop about the capstan drive assembly, at the take-up reel side, relatively to the tension outside of the loop on the supply reel side. When the tape direction is reversed the tension on the respective supply and take-up sides of the tape loop should also be reversed relative to one another. Thus with the embodiment of FIG. 1, when reel 13 is the take-up reel, the tension applied to the tape at guide 19 should exceed the tension applied to the tape at guide element 16, while when reel 12 acts as the take-up reel, the tension on the tape at guide element 16 should exceed the tension at guide element 19.

The shielding member 60 may, of course, be omitted in other cases, for example if the capstan is made of non-magnetic material. A friction surfaced capstan may be used with adequate wrap of the tape loop thereabout, in which case the idler rollers may be omitted.

I claim as my invention:

1. A transducing system comprising a capstan drive assembly including a rotatable capstan for driving engagement with a record tape wrapped about said capstan, said capstan drive assembly including tape guide means adjacent the capstan for guiding the record tape substantially throughout a loop path through a transducing region adjacent the periphery of said capstan, said tape guide means comprising stationary tape guide surfaces in sliding contact with said tape in advance of and beyond said transducing region, a transducer head for positioning at said transducing region for scanning cooperation with the record tape, said transducer head having a generally convex tape engaging surface protruding toward said capstan at said transducing region for engaging the side of the record tape remote from said capstan and slidably supporting the same at said transducing region, said stationary tape guide surfaces and said tape engaging surface of said transducer head together providing sliding engagement with the record tape substantially throughout said loop path, cartridge receiving means for mounting a cartridge having a record tape therein at a cartridge receiving space such that a length of the record tape in the cartridge extends along a tape loading path adjacent the capstan drive assembly and between the capstan drive assembly and the transducer head, and engaging means engagable with the record tape at said tape loading path for shifting the record tape to an operating tape path in wrapped relation to said capstan and said tape guide means, means for positioning the transducer head in scanning engagement with the record tape at said transducing region, and a cartridge having a record tape formed in an endless loop therein and disposed at said cartridge receiving space, said capstan and said tape guide means being located within said cartridge receiving space at one side of the tape loading path, and said engaging means comprising idler rollers mounted at the other side of the tape loading path and shiftable after the cartridge is at said cartridge receiving space into said cartridge to engage the record tape at said tape loading path and to move the record tape to said operating tape path in wrapped relation to to said capstan and said tape guide means with the idler rollers pressing the record tape into engagement at respective opposite sides of the capstan to isolate the record tape at said loop path.

2. A magnetic tape transducer system comprising a capstan drive assembly including a rotatable capstan for driving engagement with a magnetic record tape formed in a record tape loop about said capstan, said capstan drive assembly including tape guide means adjacent the capstan for slidably guiding substantially the entire record tape loop through a transducing region slightly spaced from the capstan, engaging means for maintaining the record tape loop in driving engagement with the capstan in advance of and beyond said transducing region with respect to the direction of movement of the record tape, a magnetic transducer head in engagement with the record tape loop at said transducing region for scanning cooperation with the magnetic record tape at said transducing region, said tape guide means comprising a stationary tape guide disposed adjacent said capstan and within said tape loop for slidably engaging the record tape in advance of and beyond the transducing region and having a recess at the transducing region of concave configuration such that during transducing operation the tape spans said recess and is clear of contact with said tape guide at said transducing region, said transducer head having a convex configuration generally complementary to the concave configuration of said recess of said tape guide for for projecting into said recess during sliding contact of the transducer head with the span of tape at the transducing region, and said recess having a longitudinal extent parallel to the axis of the capstan of a length to accommodate indexing movement of said transducer head parallel to the axis of said capstan for scanning cooperation with successive channels of the record tape, and means for shifting the head laterally of the direction of tape movement and parallel to the longitudinal extent of said recess to place the head in scanning relation to successive channels of the record tape.

3. A magnetic tape transducer system comprising a capstan drive assembly including a rotatable capstan for driving engagement with a magnetic record tape formed in a record tape loop about said capstan, said capstan drive assembly including tape guide means adjacent the capstan for slidably guiding substantially the entire record tape loop through a transducing region slightly spaced from the capstan, engaging means for maintaining the record tape loop in driving engagement with the capstan in advance of and beyond said transducing region with respect to the direction of movement of the tape, a magnetic transducer head in engagement with the record tape loop at said transducing region for scanning cooperation with the magnetic record tape at said transducing region, the magnetic transducer head being located at the outer side of said record tape loop and said tape guide means comprising a magnetic shielding member interposed between said capstan and said transducing region, said capstan being of magnetizable magnetic material susceptible to magnetization, and said magnetic shielding member comprising a thin sheet of magnetic material disposed in close conforming relation to a substantial portion of the periphery of said capstan in the vicinity of said transducing region.

4. In a transducing system comprising a capstan drive assembly including a rotatable capstan for driving engagement with a record tape wrapped about said capstan, said capstan drive assembly including tape guide means adjacent the capstan for guiding the record tape substantially throughout a loop path through a transducing region adjacent the periphery of said capstan, a transducer head for positioning at said transducing region for scanning cooperation with the record tape, wherein the improvement comprises cartridge receiving means for mounting a cartridge having a record tape therein at a cartridge receiving space such that a length of the record tape in the cartridge extends along a loading path adjacent the capstan drive assembly and between the capstan drive assembly and said transducer head, engaging means comprising a pair of capstan pressure rollers for shifting movement into said cartridge to shift the record tape to an operating tape path in wrapped relation to said capstan and said tape guide means with said pressure rollers pressing the tape into engagement with said capstan in advance of and beyond said tape guide means with respect to a direction of movement of the record tape along said operating tape path, and means for positioning said head at the opposite side of the operating tape path from said tape guide means, in scanning relation to a channel on the record tape at said transducing region of said tape guide means, said tape guide means having a configuration to accommodate indexing movement of the transducer head between extreme positions in scanning relation to channels at opposite margins of the record tape, and head indexing means for sequentially shifting said head for scanning relation to successive channels on the record medium in successive passes of the record tape through said transducing region.

* * * * *